United States Patent
Karn et al.

(10) Patent No.: US 11,274,548 B2
(45) Date of Patent: Mar. 15, 2022

(54) WORKOVER RIG SCHEDULING TO MAXIMIZE OIL PRODUCTION

(71) Applicant: SAP SE, Walldorf (DE)

(72) Inventors: Ashish Ranjan Karn, Delhi (IN); Chandramohan T. N, Kozhikode (IN); Srinivasan Ramanathan, TamilNadu (IN); Manish Goyal, Jalna (IN)

(73) Assignee: SAP SE, Walldorf (DE)

(*) Notice: Subject to any disclaimer, the term of this patent is extended or adjusted under 35 U.S.C. 154(b) by 171 days.

(21) Appl. No.: 16/587,206

(22) Filed: Sep. 30, 2019

(65) Prior Publication Data

US 2021/0095559 A1 Apr. 1, 2021

(51) Int. Cl.
*E21B 47/12* (2012.01)
*H04L 67/12* (2022.01)
*G06F 9/48* (2006.01)

(52) U.S. Cl.
CPC ............ *E21B 47/12* (2013.01); *G06F 9/4881* (2013.01); *H04L 67/12* (2013.01)

(58) Field of Classification Search
CPC ......... E21B 47/12; G06F 9/4881; H04L 67/12
See application file for complete search history.

(56) References Cited

U.S. PATENT DOCUMENTS 10,794,150 B2 * 10/2020 Harshbarger ...... G05B 23/0283
10,794,153 B2 * 10/2020 Meehan ............ E21B 41/0092
2020/0123878 A1 * 4/2020 Yepez ................ E21B 44/00

OTHER PUBLICATIONS

Ribeiro et al., A Simple and Robust Simulated Annealing Algorithm for Scheduling Workover Rigs on Onshore Oil Fields, May 2011, Computer & Industrial Engineering, vol. 60, Issue 4, pp. 519-526. (Year: 2011).*

Trindade et al., Hybrid Adaptive Memory Programming Using GRASP and Path Relinking for the Scheduling Workover Rigs for Onshore Oil Production, Feb. 2006, Fifth International Conference on Hybrid Intelligent Systems. (Year: 2006).*

Aloise et al., "Scheduling workover rigs for onshore oil production." Discrete Applied Mathematics 154.5, Apr. 1, 2006, 8 pages.

Bassi et al., "Planning and scheduling a fleet of rigs using simulation-optimization." Computers & Industrial Engineering 63.4, Dec. 1, 2012, 15 pages.

(Continued)

*Primary Examiner* — Franklin D Balseca
(74) *Attorney, Agent, or Firm* — Fish & Richardson P.C.

(57) ABSTRACT

Methods, systems, and computer-readable storage media for resource-efficient generation of a workover rig schedule by receiving well data and workover rig data for wells, each well producing oil, determining sets of schedules by, for each schedule in a set of schedules, incrementally: calculating a virtual gain for each well in a set of remaining wells, each virtual gain being a function of a production gain for a respective well, a travel time of a workover rig to travel from a current well to the respective well, a workover time for the respective well, a first parameter applied to the workover time, and a second parameter applied to the travel time, and selecting a well as a next well in a schedule based on a respective virtual gain; identifying, from the sets of schedules, a schedule having a maximum cumulative gain, and outputting the schedule as an optimal schedule.

20 Claims, 6 Drawing Sheets

(56) References Cited

OTHER PUBLICATIONS

Ribeiro et al., "A comparison of three metaheuristics for the workover rig routing problem." European Journal of Operational Research 220.1, Jul. 1, 2012, 9 pages.

Costa et al., "A heuristic for workover rig itinerary problem in oil wells" Brazilian Symposium on Operations Research, Nov. 26, 2004, 10 pages (With English Abstract).

Lasrado et al., "Workover Rig scheduling using reservoir simulation." Intelligent Energy Conference and Exhibition. Society of Petroleum Engineers, Jan. 1, 2008, 11 pages.

Pacheco et al., "A GRASP with path-relinking for the workover rig scheduling problem." International Journal of Natural Computing Research (IJNCR) 1.2, Apr. 1, 2010, 3 pages.

Perez et al., "A new mathematical model for the workover rig scheduling problem." Pesquisa Operacional 36.2, Aug. 2016, 15 pages.

Ribeiro et al., "A branch-price-and-cut algorithm for the workover rig routing problem." Computers & Operations Research 39.12, Dec. 1, 2012, 11 pages.

\* cited by examiner

WORKOVER RIG SCHEDULING TO MAXIMIZE OIL PRODUCTION

BACKGROUND

Typically, oil wells rely on artificial lift equipment to extract oil from the Earth. The artificial lift equipment is part of a so-called completion that requires maintenance services for cleaning, repair, reinstatement, and the like. These maintenance services are considered as relatively important activities in oil and gas industry and may be planned (e.g., scheduled maintenance) or unplanned (e.g., in response to an unexpected event). Some maintenance activities are performed by workover. The term workover generally refers to oil well intervention involving invasive techniques (e.g., wireline, coiled tubing, snubbing). In some instances, workover refers to the process of pulling and replacing a completion.

Workovers are performed using so-called workover rigs. In view of cost, complexity and other factors, oil field operators typically have a limited number of workover rigs with respect to the number of wells demanding service. Many factors are considered for deciding which workover rigs should be sent to perform the maintenance service for which wells. However, any delays in addressing the workover of a well results in loss of production. Consequently, a goal in scheduling workover rigs is to maximize production given different factors and constraints.

SUMMARY

Implementations of the present disclosure are directed to workover rig scheduling to maximize oil production. More particularly, and as described in further detail herein, implementations of the present disclosure provide a workover rig scheduling platform that generates schedules in a time- and resource-efficient manner.

In some implementations, actions include for resource-efficient generation of a workover rig schedule by receiving well data and workover rig data for a set of wells, each well producing oil, determining sets of schedules by, for each schedule in a set of schedules, incrementally: calculating a virtual gain for each well in a set of remaining wells, each virtual gain being a function of a production gain for a respective well, a travel time of a workover rig to travel from a current well to the respective well, a workover time for the respective well, a first parameter applied to the workover time, and a second parameter applied to the travel time, and selecting a well as a next well in a schedule based on a respective virtual gain; identifying, from the sets of schedules, a schedule having a maximum cumulative gain, and outputting the schedule as an optimal schedule. Other implementations of this aspect include corresponding systems, apparatus, and computer programs, configured to perform the actions of the methods, encoded on computer storage devices.

These and other implementations can each optionally include one or more of the following features: actions further include determining a minimum value of the first parameter, a maximum value of the first parameter, a minimum value of the second parameter, and a maximum value of the second parameter, wherein values of the first parameter change between the minimum value and the maximum value over increments and values of the second parameter change between the minimum value and the maximum value over increments; schedules in a set of schedules are determined based on a static value of the first parameter and a dynamic value of the second parameter; each set of schedules in the sets of schedules is determined based on a dynamic value of the first parameter; actions further include receiving user input including a change to the schedule, and in response and based on the change, again executing determining sets of schedules to provide sets of revised schedules, identifying, from the sets of revised schedules, a revised schedule having a maximum cumulative gain, and outputting the revised schedule as the optimal schedule; the well data includes one or more of well identifiers, well gains, locations, availability dates, distances between wells; and the workover rig data includes one or more of workover rig identifiers, number of workover rigs, type of workover rigs, availability dates, workover rig time to process a well.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to workover rig scheduling to maximize oil production. More particularly, and as described in further detail herein, implementations of the present disclosure provide a workover rig scheduling platform that generates schedules in a time- and resource-efficient manner. Implementations can include actions for resource-efficient generation of a workover rig schedule by receiving well data and workover rig data for a set of wells, each well producing oil, determining sets of schedules by, for each schedule in a set of schedules, incrementally: calculating a virtual gain for each well in a set of remaining wells, each virtual gain being a function of a production gain for a respective well, a travel time of a workover rig to travel from a current well to the respective well, a workover time for the respective well, a first parameter applied to the workover time, and a second parameter applied to the travel time, and selecting a well as a next well in a schedule based on a respective virtual gain; identifying, from the sets of schedules, a schedule having a maximum cumulative gain, and outputting the schedule as an optimal schedule.

To provide further context for implementations of the present disclosure, and as introduced above, oil wells rely on artificial lift equipment to extract oil from the Earth. The artificial lift equipment is part of a so-called completion that requires maintenance services for cleaning, repair, reinstatement, and the like. These maintenance services are considered as relatively important activities in oil and gas industry and may be planned (e.g., scheduled maintenance) or unplanned (e.g., in response to an unexpected event). Some maintenance activities are performed by workover. The term workover generally refers to oil well intervention involving invasive techniques (e.g., wireline, coiled tubing, snubbing). In some instances, workover refers to the process of pulling and replacing a completion.

Workovers are performed using so-called workover rigs. In view of cost, complexity and other factors, oil field operators typically have a limited number of workover rigs with respect to the number of wells demanding service. Many factors are considered for deciding which workover rigs should be sent to perform the maintenance service for which wells. However, any delays in addressing the workover of a well results in loss of production. Consequently, a goal in scheduling workover rigs is to maximize production given different factors and constraints.

In further detail, scheduling of workover rigs for maintenance activities in an oil field significantly influences production of that oil field. With regard to scheduling, there is typically a constraint on the number of workover rigs that are available for any given project including workover rigs that have special features and are to be prioritized for specific projects. Workover rigs are expensive resources that should be carefully allocated in any oil and gas operation. It is the task of the operations team to determine the plan for use the workover rigs in order to put a schedule in place. In general, scheduling of workover rigs has typically been done by field experts manually using their experience in view of availability of respective workover rigs. Traditionally, decisions are manual and intuitive and are based on well-specific data and other field parameters.

More recently, workover rig scheduling programs (i.e., computer-executable software) have been developed and have proven to be beneficial for effective workover rig scheduling. However, traditional workover rig scheduling programs lack an intelligence used for scheduling and do not consider all constraints or business rules used in practical scheduling. Further, traditional workover rig scheduling programs are inefficient in terms of time and/or computing resources (e.g., processors, memory) in calculating workover rig schedules. One example scheduling approach sought to achieve the optimum usage of workover rigs and is based on a mathematical model having variables to account for rig start, finish and in-process states. In this example, the problem was formulated as an optimization problem where the objective function was designed to reduce the total production loss. Another example scheduling approach provided decomposed mathematical models having a smaller number of variables. The decomposed models were built under the assumption that the travel time required for the workover rigs between wells was relatively very less when compared to the workover time and the initial mobilization time. However, travel time can play a significant role in certain scenarios, such as when deciding where to go when there are wells spread across multiple oil fields and the oil fields being relatively far apart.

In another example approach, a simulation-optimization method was used to generate workover rig schedules. Here, simulations are used to perform different scenarios and under uncertainty conditions, while optimization is used to tune the configuration parameters of the system. Two approaches were tried in the optimization phase, one using a constructive heuristic which is a greedy approach for ordering and sequencing of wells until all wells allocated. The second approach is variant of the earlier approach used to escape local optima. Other example scheduling approaches, include reservoir simulation, a greedy randomized adaptive search for finding an approximate solution to combinatorial optimization problems, and a branch-price and cut algorithm that relies on vehicle routing was developed.

Each of these traditional approaches to workover rig scheduling has one or more disadvantages. For example, in some scenarios, traditional scheduling algorithms can struggle to reach and prove optimality. That is, for example, significant computing resources (e.g., processor power, memory) are expended in an effort to achieve an optimized solution, but the solution provided can not be guaranteed to be optimal.

In view of the above context, implementations of the present disclosure provide a workover rig scheduling (WRS) platform. As described in further detail herein, the WRS platform of the present disclosure is based on the view that the most important key decision for qualifying a workover rig schedule is to achieve maximum production gain. In some implementations, the production gain is generally estimated as a difference between a current production capacity of a well and the potential production capacity from the well. As described in further detail herein, the WRS platform of the present disclosure provides schedules in a time- and resource-efficient manner, as compared to traditional scheduling approaches.

In further detail, oil production is of primary concern to any oil and gas operator and the daily oil production data of a well can reveal its current production capacity. Moreover, the potential production capacity of a well is known in advance. Any discrepancy between the current production capacity and the potential production capacity can indicate an issue with the respective well and lead to workover of that well. In other words, workover of a well can result from a well going down completely or when its current production capacity goes below a threshold production capacity. Production gain can be described as a difference between the potential production capacity (i.e., what the well should be able to produce) and the current production capacity (i.e., what the well is actually producing) and is considered a key parameter that can be interpreted as the loss in production for that well. If a workover is triggered for a well with high production gain, there is a continued loss in production (which is equivalent to the production gain of the well) until the well is serviced by a workover rig. Moreover, the workover required for wells can vary, as each workover can require a different amount of time to complete. Further, wells can be spread across large geographical regions that are divided into fields, pads and cellars.

In view of the foregoing, the WRS platform of the present disclosure executes a WRS algorithm that is time-efficient and resource-efficient, in terms of computing resources, as compared to traditional approaches. The WRS algorithm of the present disclosure accounts for the following parameters: production well gain, well workover time, travel time, well availability, inventory availability, multiple rigs, and manual sequencing. With regard to production well gain, the WRS algorithm prioritizes wells having higher gains. This is because the loss in production remains high as long as wells with high well gains are not maintained. With regard to well workover time, the kind of workover required for each well might be different and each workover type can require a different amount workover time. It is not desirable to have the workover rig stuck at a well due to its relatively large workover time even if the gain is high. For example, it may be possible for the workover rig to service multiple other wells in the same timeframe and achieve improved production over servicing a single high-gain well.

With regard to travel time, for a workover rig to service a well, the workover rig first needs to travel to that well. The wells needing workover are typically scattered across oil fields. Oil wells are distributed in rows and multiple rows are grouped into pads. Each oil filed will have multiple pads. The travel time is considered from the current well in a row of a pad within a field to next well in a row of a pad within a field (e.g., the same field or another field). It is not ideal, if the workover rig were to move continuously between fields, because the time taken to travel across fields is higher than the time to travel within fields. With regard to well availability, it can occur that workover is ordered for a well, but the well may not be available for a certain period of time. With regard to inventory availability, it can occur that, although workover is ordered for a well, the inventory for performing the workover (materials or components required for performing the workover) may not be available for a period of time. With regard to multiple rigs, the WRS algorithm provides a proposal for multiple workover rigs in view of the described constraints. With regard to manual sequencing, the WRS algorithm considers manual priorities for a workover to override a subsequent workover.

In accordance with implementations of the present, the objective of the WRS algorithm is to produce a schedule that provides a maximum cumulative gain at the end of a specified period of time. In some implementations, an individual gain (IndividualGain) for each well (w) is determined, and the cumulative gain (Cumulative Gain) is determined based on the individual gains. The following example relationships are provided:

$$\text{IndividualGain}(w) = \text{WellGain}(w) * [\text{Schedule Duration} - \text{EndDate}(w)] \quad (1)$$

$$\text{CumulativeGain}(w) = \sum_{w=1}^{n} \text{IndividualGain}(w) \quad (2)$$

where ScheduleDuration is the period of time (e.g., provided in days) that the resulting workover rig schedule runs for, and EndDate is the date, on which the workover is to be completed for a respective well.

A modest way to maximize cumulative gain is by sorting gains of each well in descending order and schedule wells according to that sorted order. However, and as noted above, it can occur that wells with high gains can have large workover times and/or the time required to reach those wells might be high. This can result in the schedule ending late, which is not ideal. In view of this, the WRS algorithm of the present disclosure is designed in such a way that, even if the next chosen well is not ideal in terms of well gain, workover time or travel time, well availability, inventory availability, the cumulative gain is still maximized at the end of schedule duration.

Figure 1:
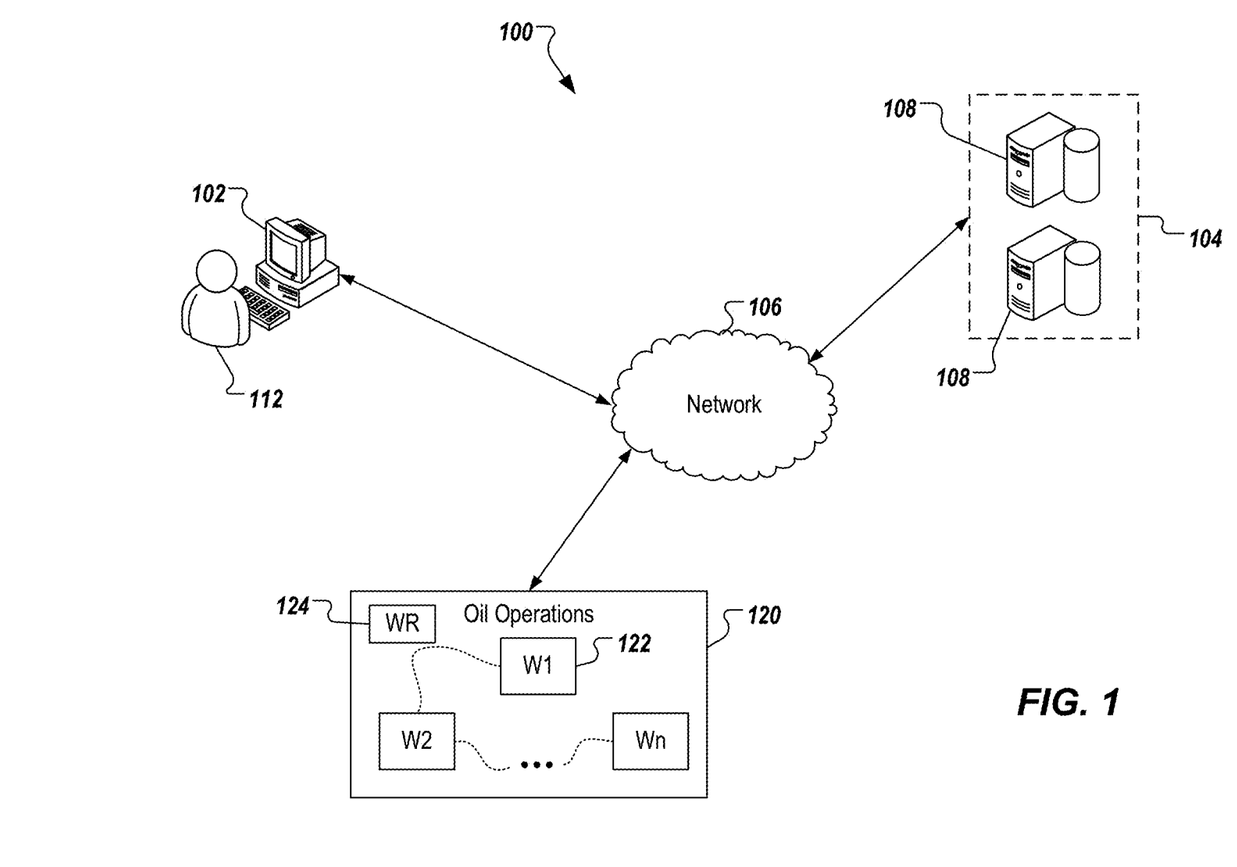
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104, a network 106, and oil and gas operations 120. The server system 104 includes one or more server devices and databases 108 (e.g., processors, memory). In the depicted example, a user 112 interacts with the client device 102. In an example context, the user 112 can include a user (e.g., enterprise operators), who interacts with a WRS platform hosted by the server system 104.

In some examples, the client device 102 can communicate with the server system 104 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases. An example in-memory database system includes SAP HANA provided by SAP SE of Walldorf, Germany.

In the example of FIG. 1, the oil and gas operations 120 includes wells 122 and one or more workover rigs 124 that can travel between wells to perform workover. In some examples, the oil and gas operations 120 can include tens, hundreds, or thousands of wells geographically spread across multiple oil fi In some examples, a set of wells (e.g., W1, ..., Wn) can be identified as requiring workover over a given schedule duration. As described in further detail herein, the WRS platform of the present disclosure provides a schedule that maximizes cumulative gain of the wells in the set of wells over the schedule duration. In some examples, the schedule is displayed to the user 112 by the computing device 102, and the user 112 can manually edit the schedule. As described in further detail herein, manual changes to the schedule trigger recalculation of the schedule to provide a new (updated) schedule.

Figure 2:
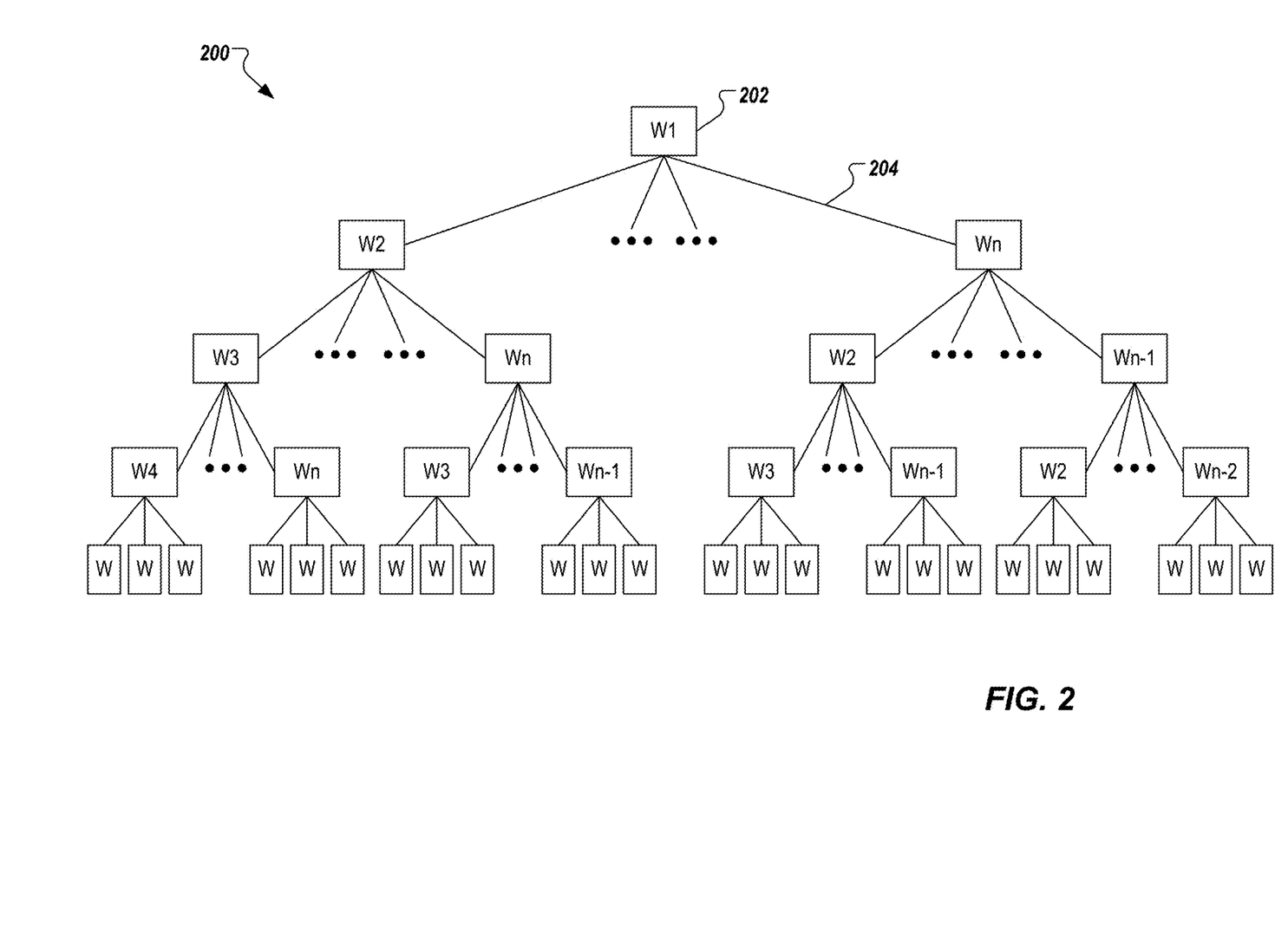
FIG. 2 depicts an example connected graph depicting potential workover rig movement between wells.

Because each workover rig is free to move to any well from its current location, the entire workover rig movement can be visualized in the form of a fully connected graph. FIG. 2 depicts an example connected graph 200 depicting potential workover rig movement between wells. In the example of FIG. 2, each node 202 represents a well and each edge 204 denotes a total delay for movement between wells. In some examples, the total delay is determined as a sum of workover time for a well and travel time to the next well. Assuming well one (W1) is the starting point for a workover rig, the next well to be scheduled is selected from the remaining n−1 wells. At each level of the connected graph 200, the number of wells to select from is reduced by one, as each well is processed by the workover rig.

An optimal schedule will be a path through the nodes 202 of the connected graph 200. However, finding the optimal path would require exploring every potential path through the entirety of the connected graph 200. This would require a significant amount of computing resources (e.g., processing power, memory) and would be so time-inefficient, as to be infeasible in reality. For example, if there are n wells, then there are n! possible ways to schedule workover for the n wells, assuming the first well is fixed. An oil operation typically includes hundreds of wells and can include a significant number that may require workover. Assuming a modest number of ten (10) wells requiring workover (i.e., n=10), there would be approximately 3.6 million paths to be processed and an optimized path to be calculated. This requires a significant expenditure in calculation time, and thus, computing resources to perform the calculations.

In view of this, the WRS algorithm of the present disclosure leverages heuristics to traverse such large connected graphs to find an optimal or near-optimal path in a time-efficient and resource-efficient manner. More particularly, the WRS algorithm of the present disclosure uses a non-linear heuristic referred to as virtual gain (VirtualGain). In accordance with implementations of the present disclosure, the virtual gain for each well that is a potential next well in the schedule is calculated and the next well is scheduled by the WRS algorithm based on the respective virtual gains. In some implementations, the virtual gain for a well is calculated as:

$$VirtualGain = \frac{G}{T^\alpha \times S^\beta} \quad (3)$$

where G is the production gain for the next well, T denotes the time to travel from the current well to the next well, S is the workover time for the next well, and α and are parameters used to control the influence of travel time and workover time, respectively, in the value determined for the virtual gain. Once the virtual gains have been calculated for each of the potential next wells, the next well can be selected based on the following example relationship:

$$NextWell = {}_w^{argmax}[VG \times (Schedule - Day - Delay)] \quad (4)$$

where Schedule is the schedule duration (e.g., provided as a user input), Day is the current day (e.g., the number of days since the schedule started), and Delay is the sum of travel time to and workover time of the well that is potentially next. Accordingly, the term (Schedule−Day−Delay) can be interpreted as the number of days a well will be in production after workover has been performed. By combining both virtual gain and the next well value, it is intuitively determined how good of a selection a particular well may be as the next well in the schedule and the gain that can be achieved from that well. The well which gives maximum value is scheduled next by the WRS algorithm.

The following example pseudo-code describes the WRS algorithm in accordance with implementations of the present disclosure:

| Algorithm 1: Workover Rig Scheduling (WRS) Algorithm |
| --- |
| 1   Result: Maximum cumulative gain at the end of schedule |
| 2   duration |
| 3   The schedule duration is a user input. |
| 4   alpha, beta = minAlpha, minBeta; |
| 5   maxGain = 0; |
| 6   while alpha < maxalpha do |
| 7       beta = minBeta; |
| 8       while beta < maxBeta do |
| 9           Set Day = 0; |
| 10          Initialize current well location of rig |
| 11          while until all workorders are processed do |
| 12              while remaining wells (w) do |
| 13                  Virtual gain (w) = G / (Tα * Sβ) |
| 14                  Next Well = argmax_w[VG * (Schedule-Day-Delay)] |
| 15                  Current well = Next Well |
| 16              end |
| 17              Calculate CumulativeGain for the schedule; |
| 18          end |
| 19          if CumulativeGain > maxGain then |
| 20              maxGain = CumulativeGain; |
| 21              bestSchedule = current schedule; |
| 22          end |
| 23          increment beta; |
| 24      end |
| 25      increment alpha; |
| 26  end |

As described, the WRS algorithm of the present disclosure achieves efficiencies in consumption of computing resources required to generate an optimal schedule, at least in part, using dynamic non-linear coefficients, namely, α and β introduced above. In accordance with implementations of the present disclosure, a simulation engine is provided, which estimates the non-linear coefficients used in the WRS algorithm. In some examples, the simulation engine is coupled with the WRS algorithm to achieve maximum cumulative gain while adhering to constraints (e.g., user constraints, business constraints). In some implementations, the values minAipha, minBeta, maxAlpha and maxBeta are estimated from the simulation engine and are set after determining cumulative gains. In some examples, the cumulative gains are normalized (e.g., to range from 0 to 1). In some implementations, the values are computed by scheduling random workover sub-samples and determining the cumulative gains of the respective workovers. The simulation engine was used for a sample date set to estimate the coefficients. Based on this, values of α ranging between approximately 0.6 (e.g., minAipha) to approximately 1.6 (e.g., maxAlpha), and values of β ranging between approximately 0.6 (e.g., minBeta) to approximately 1.5 (e.g., maxBeta), provide schedules that achieve maximum cumulative gain.

By way of non-limiting example, and with reference to FIG. 2, a set of wells that are to receive workover can includes wells W1, . . . Wn. In this example, a well W1 can be determined to be an initial well to receive workover in a schedule. For each remaining well in the set of wells (i.e., all wells except well W1), a virtual gain is determined as described herein, and a next well in the schedule can be identified based on the respective virtual gains. For example, it can be determined that a well W4 is to be the next well in the schedule. Consequently, at this iteration, the schedule includes W1, W4. For each remaining well in the set of wells (i.e., all wells except well W1, W4), a virtual gain is again determined as described herein, and a next well in the schedule can be identified based on the respective virtual gains. For example, it can be determined that a well W2 is to be the next well in the schedule. Consequently, at this iteration, the schedule includes W1, W4, W2. This process is repeated until all wells in the set of wells are scheduled.

Figure 3:
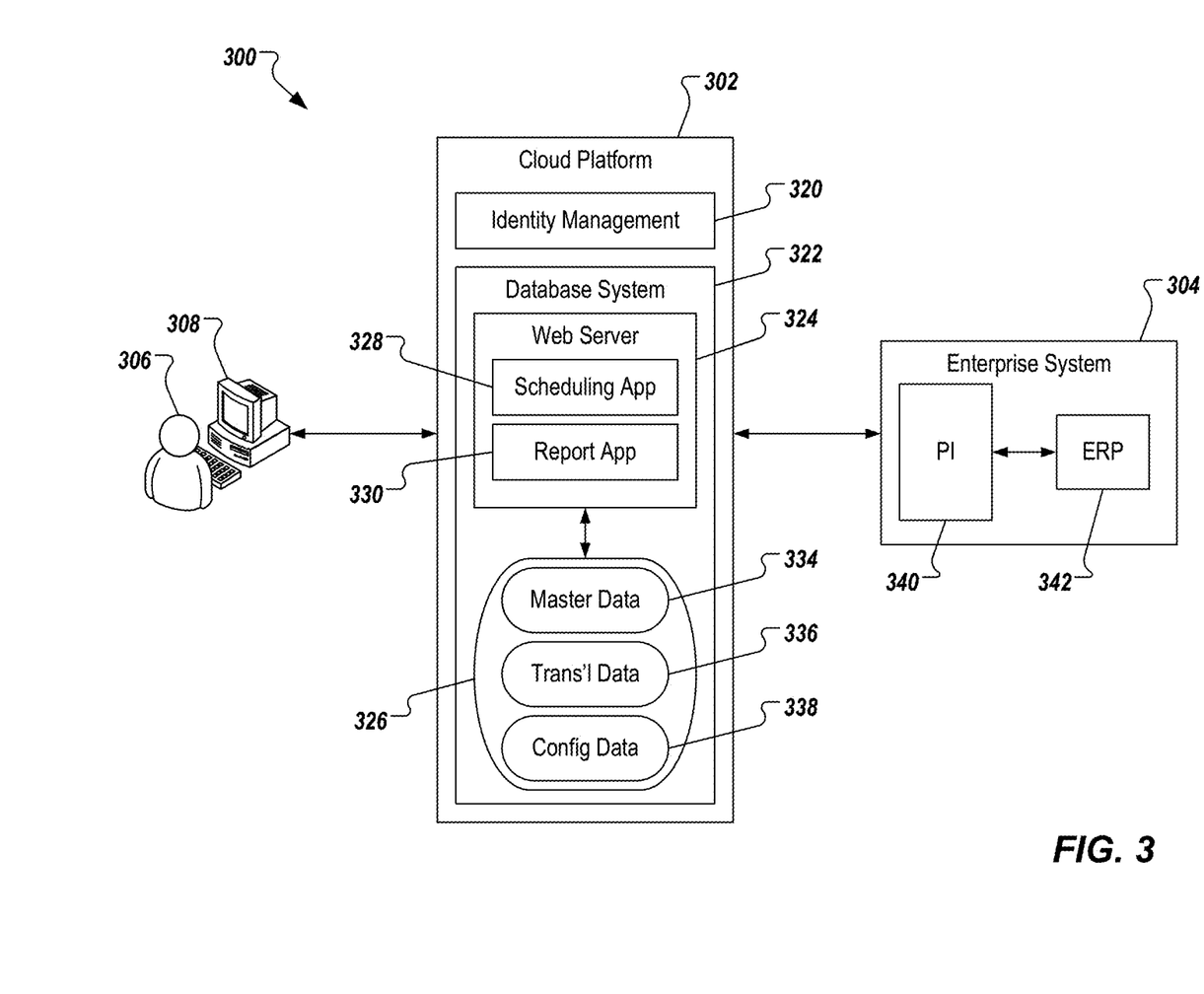
FIG. 3 depicts an example conceptual architecture in accordance with implementations of the present disclosure.

FIG. 3 depicts an example conceptual architecture 300 in accordance with implementations of the present disclosure. More particularly, the WRS platform of the present disclosure can be executed within the example conceptual architecture 300 to collect workover-related data from one or more systems (e.g., an enterprise resource planning (ERP) system of an oil and gas enterprise), to propose an optimized workover rig schedule, as described herein, and to provide reports representative of identified scenarios. In some implementations, the WRS platform enables manual changes to a proposed schedule and provides an updated schedule based on the manual changes. Example manual changes include, without limitation, prioritizing workover of a specific well a specific workover rig and changing the inventory and/or well availability dates for a specific well. In the example of FIG. 3, the example conceptual architecture 300 includes a cloud platform 302 and an enterprise system 304. In some examples, a user 306 can interact with the cloud platform 302 through a computing device 308 to generate and/or edit workover rig schedules as described herein.

In accordance with implementations of the present disclosure, the cloud platform 302 hosts the WRS platform, as described herein. In the depicted example, the cloud platform 302 includes an identity management service 320 and a database system 322. In some examples, the identity management service 320 authenticates users (e.g., based on credentials, such as username and password) before enabling access to the WRS platform. In the depicted example, the database system 322 includes a web server 324 and a datastore 326. An example database system 322 includes SAP HANA provided by SAP SE of Walldorf, Germany, which provides SAP HANA Extended Application Services (XS) that can be used to execute the web server 324. In some examples, the web server 324 executes a WRS application 328 and a reporting application. In the depicted example, the datastore 326 stores master data 334, transactional data 336, and configuration data 338.

In some examples, the master data 334 includes, without limitation, well master data (e.g., Well ID, Well Name, Well Type, Field, Pad, Row), rig master data (e.g., Rig ID, Rig Name), and well distance mapping. In some examples, the transactional data includes, without limitation, workover data (e.g., Workover ID, Well ID, Well Processing Time, Well Availability Date, Inventory Availability Date, Workover Creation Date, Workover Status), rig availability data (e.g., Availability Date, Current Location), and well production data (e.g., Workover ID, Well ID, Current Production, Maximum Production). In some examples, the configuration data includes, without limitation, minAlpha and maxAlpha, minBeta and maxBeta, a coefficient increment factor, and a maximum schedule duration.

In the example of FIG. 2, the enterprise system 302 includes a process integration (PI) application 340 and an ERP system 342. In some examples, the enterprise system 304 is executed by, or on behalf of an enterprise that performs operations. In the context of the instant application, the enterprise system 304 can be operated by, or on behalf of an oil and gas enterprise that operates wells across one or more oil fields. In some examples, the PI application 340 facilitates the exchange of data between the enterprise system 304 (e.g., the ERPS system 342) and the cloud platform 302. In the context of the present disclosure, the ERP system 342 can maintain data representative of the oil and gas operations of the enterprise including, without limitation, well data (e.g., well identifiers, well gains, locations, availability dates, distances between wells) and workover rig data (e.g., workover rig identifiers, number of workover rigs, type of workover rigs, availability dates, workover rig time to process a well). In some examples, the well data and workover rig data of the ERP system 342 is provided to the cloud platform 302 through the PI application 340.

In accordance with implementations of the present disclosure, the WRS platform generates schedules based on the well data and the workover rig data provided from the enterprise system 304. More particularly, the scheduling application 328 executes the WRS algorithm to generate a schedule, as described herein. The schedule can be displayed to the user 306 in a user interface (UI) displayed by the computing device 308. In some examples, the user 306 can provide manual input to the UI to make one or more changes. As described herein, example changes can include, without limitation, prioritizing workover of a specific well a specific workover rig and changing the inventory and/or well availability dates for a specific well.

Figure 4:
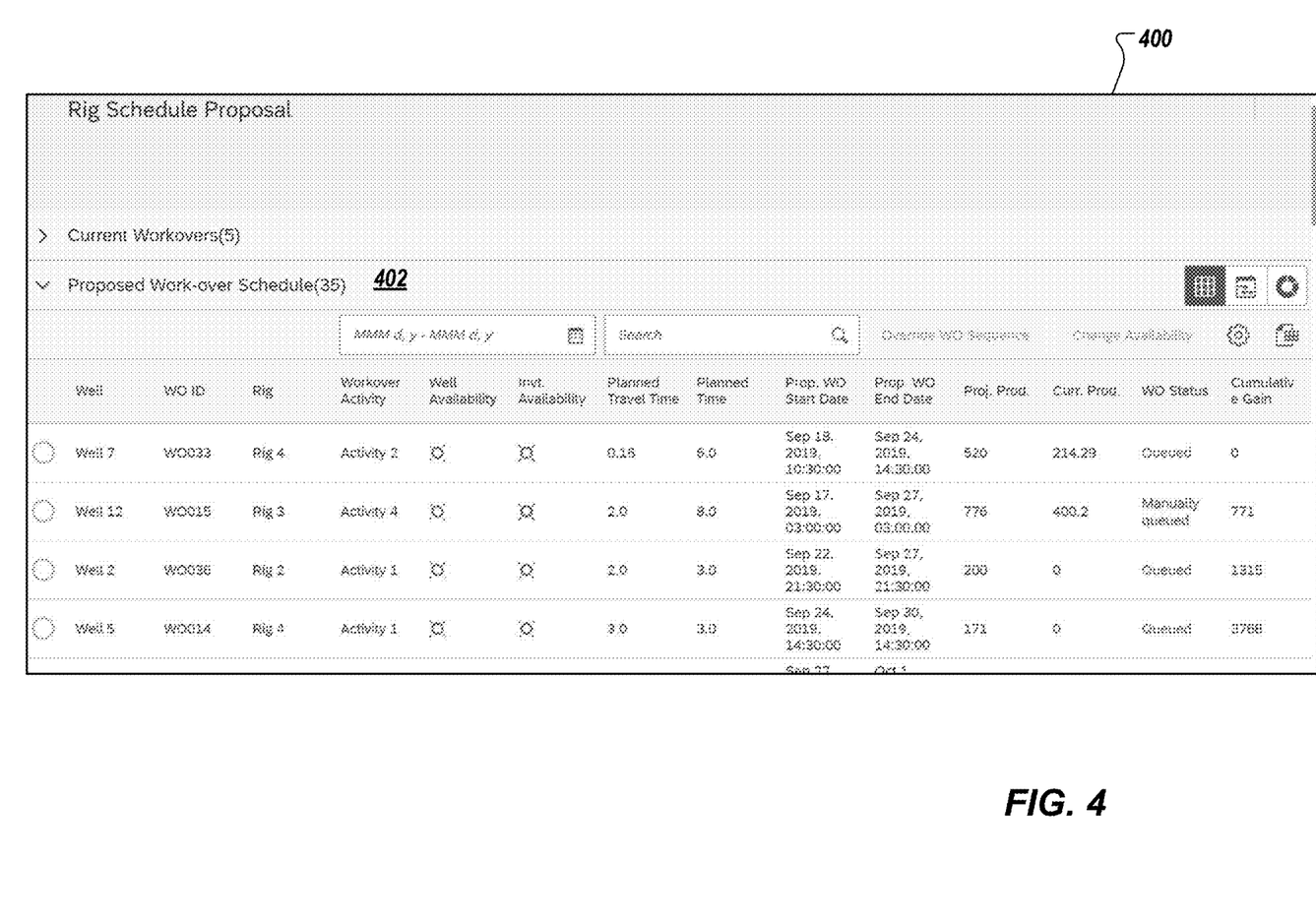
FIG. 4 depicts an example user interface (UI) depicting an example schedule in accordance with implementations of the present disclosure.

FIG. 4 depicts an example UI 400 depicting an example schedule 402 in accordance with implementations of the present disclosure. The example schedule 402 provides a schedule of workovers to be performed on wells. Each well is associated with a respective well identifier (e.g., Well7) that uniquely identifies the well and is provided from an enterprise system (e.g., as well data from the enterprise system 304 of FIG. 3). Each workover is assigned a workover identifier (WO ID) that uniquely defines the respective workover and an identifier of the rig that is to perform the respective workover is also provided (e.g., Rig4). In some examples, identifiers of the rigs are provided from the enterprise system (e.g., as workover rig data from the enterprise system 304 of FIG. 3). As described herein, the WRS algorithm of the present disclosure provides the schedule 402 to maximize a cumulative gain of the wells over the duration of the schedule. In the example, of FIG. 4, the cumulative gain that is achieved over the progression of the schedule 402 is displayed.

The UI 400 enables a user (e.g., the user 306) to provide manual changes. For example, the UI 400 enables the user to override the workover sequence (e.g., change the order of the workovers in the schedule) and/or change availability data (e.g., of wells and/or workover rigs). In some examples, in response to one or more manual changes, the schedule is revised to provide an updated schedule. That is, for example, the WRS platform re-determines the schedule using the manual changes as additional constraints.

Figure 5:
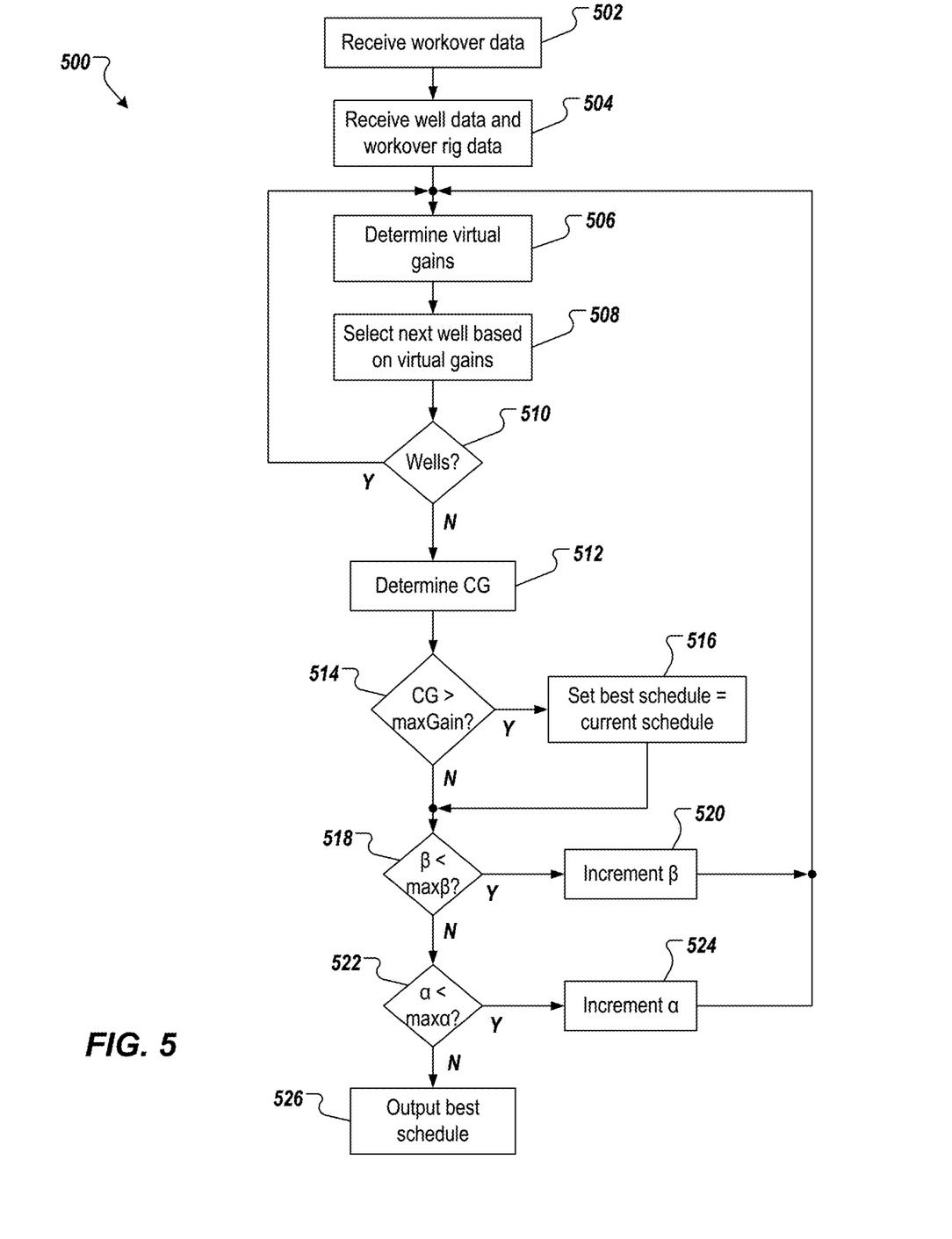
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

Workover data is received (502). For example, a user can provide input to the WRS platform indicating a set of wells that are to receive workover. In some examples, the workover data can include a list of workorders, each workorder identifying a well and a workover rig that is to perform workover on the respective well. Well data and workover rig data are received (504). For example, the WRS platform can receive well data for each well in the set of wells and workover rig data for each workover rig provided in a workorder. In some examples, and as described in detail herein, the well data and the workover rig data are received from an enterprise system (e.g., ERP system) of an oil and gas operator. In some examples, the workover data identifies a well in the set of wells as a first well to be scheduled for workover.

In some implementations, two categories of workover lists can be provided at the start. For example, an in-process workover list and/or a queued workover list can be provided. The number of in-process workovers will be equal to the number of workover rigs available to be scheduled. The queued workovers are only scheduled using the number of workover igs available. For example, if there are three workovers that are in in-process and twenty workovers are in queued, then the twenty workovers that are in queued will be scheduled using three workover rigs. The in-process workovers will not be scheduled as the workover rigs are already working on the wells.

The WRS algorithm is initialized by setting alpha=minAlpha, beta=minBeta, and maxGain=0. In an initial loop, virtual gains are determined (506). That is, and as described herein, virtual gains are calculated for each of the remaining wells in the set of wells (i.e., each well that has not already been scheduled). A next well is selected based on the virtual gains (508). For example, and as described herein, a well is selected as the next well in the schedule as the well that will contribute most to increasing the cumulative gain based on its virtual gain. It is determined whether there are any wells remaining in the set of wells (510). That is, it is determined whether all wells in the set of wells have been considered and scheduled. If there are wells remaining, the example process 500 loops back to continue scheduling until a current schedule includes all wells in the set of wells.

If there are no wells remaining in the set of wells (i.e., all wells have been scheduled in the current schedule), a cumulative gain (CG) is determined based on the current schedule (512) and it is determined whether the cumulative gain is greater than a maximum gain (514). If the cumulative gain is greater than the maximum gain, the best schedule is set to the current schedule (516).

It is determined whether $\beta$ is less than max$\beta$ (518). If $\beta$ is less than max$\beta$, $\beta$ is incremented (520) and the example process 500 loops back. More particularly, the example process 500 loops back to reset the current schedule and loop through the set of wells to provide another current schedule based on the incremented value of $\beta$.

If $\beta$ is not less than max$\beta$, it is determined whether $\alpha$ is less than max$\alpha$ (522). If $\alpha$ is less than max$\alpha$, $\alpha$ is incremented (524) and the example process 500 loops back. More particularly, the example process 500 loops back to reset the current schedule and reset the value of $\beta$ to min$\beta$ and loop through the set of wells to provide another round of current schedules based on the incremented value of $\alpha$. If $\alpha$ is not less than max$\alpha$, the best schedule is provided as output (526). Accordingly, the WRS algorithm provides the best schedule as output, which represents the schedule that achieves the highest cumulative gain across the various current schedules defined.

Figure 6:
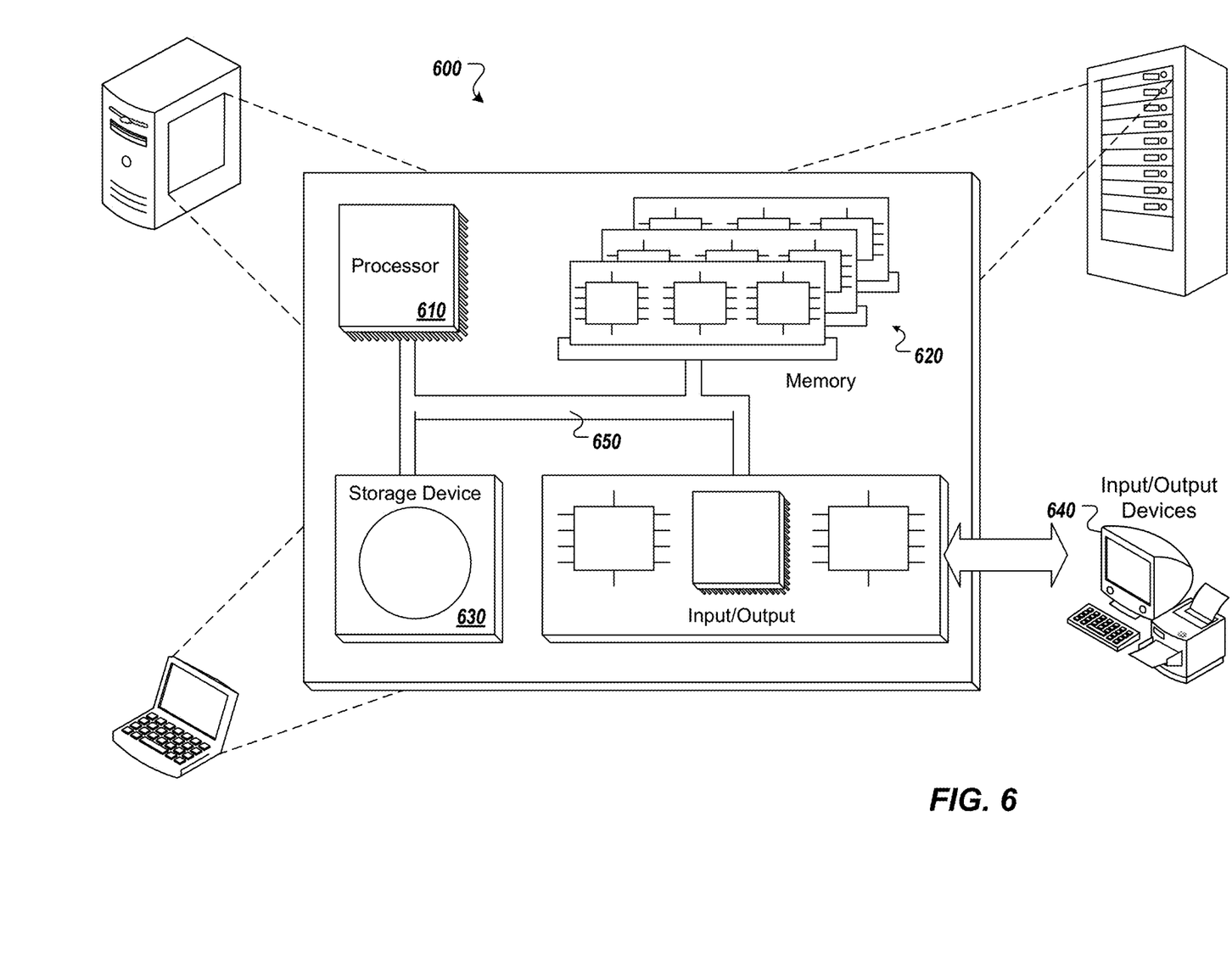
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for resource-efficient generation of a workover rig schedule, the method being executed by one or more processors and comprising:
    receiving well data and workover rig data for a set of wells, each well producing oil;
    determining, for each schedule in a set of schedules, a cumulative gain by:
        incrementally:
            calculating a virtual gain for each well in a set of remaining wells, each virtual gain being a function of a production gain for a respective well, a travel time of a workover rig to travel from a current well to the respective well, a workover time for the respective well, a first parameter applied to the workover time for the respective well, and a second parameter applied to the travel time to travel from the current well to the respective well, and
            selecting a well as a next well in a schedule based on a respective virtual gain, and
        summing virtual gains to provide the cumulative gain;
    identifying, from the set of schedules, a schedule having a maximum cumulative gain; and
    outputting the schedule having the maximum cumulative gain as an optimal schedule.

2. The method of claim 1, further comprising determining a minimum value of the first parameter applied to the workover time for the respective well, a maximum value of the first parameter applied to the workover time for the respective well, a minimum value of the second parameter applied to the travel time to travel from the current well to the respective well, and a maximum value of the second parameter applied to the travel time to travel from the current well to the respective well, wherein values of the first parameter applied to the workover time for the respective well change between the minimum value of the first parameter applied to the workover time for the respective well and the maximum value of the first parameter applied to the workover time for the respective well over increments and values of the second parameter applied to the travel time to travel from the current well to the respective well change between the minimum value of the second parameter applied to the travel time to travel from the current well to the respective well and the maximum value of the second parameter applied to the travel time to travel from the current well to the respective well over increments.

3. The method of claim 1, wherein schedules in the set of schedules are determined based on a static value of the first parameter applied to the workover time for the respective well and a dynamic value of the second parameter applied to the travel time to travel from the current well to the respective well.

4. The method of claim 1, wherein each schedule in the set of schedules is determined based on a dynamic value of the first parameter applied to the workover time for the respective well.

5. The method of claim 1, further comprising:
    receiving user input comprising a change to the optimal schedule, and in response and based on the change, again executing determining a cumulative gain to provide a set of revised schedules;
    identifying, from the set of revised schedules, a revised schedule having a maximum cumulative gain; and
    outputting the revised schedule having the maximum cumulative gain as the optimal schedule.

6. The method of claim 1, wherein the well data comprises one or more of well identifiers, well gains, locations, availability dates, distances between wells.

7. The method of claim 1, wherein the workover rig data comprises one or more of workover rig identifiers, number of workover rigs, type of workover rigs, availability dates, workover rig time to process a well.

8. A non-transitory computer-readable storage medium coupled to one or more processors and having instructions stored thereon which, when executed by the one or more processors, cause the one or more processors to perform operations for resource-efficient generation of a workover rig schedule, the operations comprising:

receiving well data and workover rig data for a set of wells, each well producing oil;

determining, for each schedule in a set of schedules, a cumulative gain by:

incrementally:

calculating a virtual gain for each well in a set of remaining wells, each virtual gain being a function of a production gain for a respective well, a travel time of a workover rig to travel from a current well to the respective well, a workover time for the respective well, a first parameter applied to the workover time for the respective well, and a second parameter applied to the travel time to travel from the current well to the respective well, and selecting a well as a next well in a schedule based on a respective virtual gain, and summing virtual gains to provide the cumulative gain;

identifying, from the set of schedules, a schedule having a maximum cumulative gain; and outputting the schedule having the maximum cumulative gain as an optimal schedule.

9. The computer-readable storage medium of claim 8, wherein operations further comprise determining a minimum value of the first parameter applied to the workover time for the respective well, a maximum value of the first parameter applied to the workover time for the respective well, a minimum value of the second parameter applied to the travel time to travel from the current well to the respective well, and a maximum value of the second parameter applied to the travel time to travel from the current well to the respective well, wherein values of the first parameter applied to the workover time for the respective well change between the minimum value of the first parameter applied to the workover time for the respective well and the maximum value of the first parameter applied to the workover time for the respective well over increments and values of the second parameter applied to the travel time to travel from the current well to the respective well change between the minimum value of the second parameter applied to the travel time to travel from the current well to the respective well and the maximum value of the second parameter applied to the travel time to travel from the current well to the respective well over increments.

10. The computer-readable storage medium of claim 8, wherein schedules in the set of schedules are determined based on a static value of the first parameter applied to the workover time for the respective well and a dynamic value of the second parameter applied to the travel time to travel from the current well to the respective well.

11. The computer-readable storage medium of claim 8, wherein each schedule in the set of schedules is determined based on a dynamic value of the first parameter applied to the workover time for the respective well.

12. The computer-readable storage medium of claim 8, wherein operations further comprise:

receiving user input comprising a change to the optimal schedule, and in response and based on the change, again executing determining a cumulative gain to provide a set of revised schedules;

identifying, from the set of revised schedules, a revised schedule having a maximum cumulative gain; and outputting the revised schedule having the maximum cumulative gain as the optimal schedule.

13. The computer-readable storage medium of claim 8, wherein the well data comprises one or more of well identifiers, well gains, locations, availability dates, distances between wells.

14. The computer-readable storage medium of claim 8, wherein the workover rig data comprises one or more of workover rig identifiers, number of workover rigs, type of workover rigs, availability dates, workover rig time to process a well.

15. A system, comprising:

a computing device; and a computer-readable storage device coupled to the computing device and having instructions stored thereon which, when executed by the computing device, cause the computing device to perform operations for natural language explanations for resource-efficient generation of a workover rig schedule, the operations comprising:

receiving well data and workover rig data for a set of wells, each well producing oil;

determining, for each schedule in a set of schedules, a cumulative gain by:

incrementally:

calculating a virtual gain for each well in a set of remaining wells, each virtual gain being a function of a production gain for a respective well, a travel time of a workover rig to travel from a current well to the respective well, a workover time for the respective well, a first parameter applied to the workover time for the respective well, and a second parameter applied to the travel time to travel from the current well to the respective well, and selecting a well as a next well in a schedule based on a respective virtual gain, and summing virtual gains to provide the cumulative gain;

identifying, from the set of schedules, a schedule having a maximum cumulative gain; and outputting the schedule having the maximum cumulative gain as an optimal schedule.

16. The system of claim 15, wherein operations further comprise determining a minimum value of the first parameter applied to the workover time for the respective well, a maximum value of the first parameter applied to the workover time for the respective well, a minimum value of the second parameter applied to the travel time to travel from the current well to the respective well, and a maximum value of the second parameter applied to the travel time to travel from the current well to the respective well, wherein values of the first parameter applied to the workover time for the respective well change between the minimum value of the first parameter applied to the workover time for the respective well and the maximum value of the first parameter applied to the workover time for the respective well over increments and values of the second parameter applied to the travel time to travel from the current well to the respective well change between the minimum value of the second parameter applied to the travel time to travel from the current well to the respective well and the maximum value of the second parameter applied to the travel time to travel from the current well to the respective well over increments.

17. The system of claim 15, wherein schedules in the set of schedules are determined based on a static value of the first parameter applied to the workover time for the respective well and a dynamic value of the second parameter applied to the travel time to travel from the current well to the respective well.

18. The system of claim 15, wherein each schedule in the set of schedules is determined based on a dynamic value of the first parameter applied to the workover time for the respective well.

19. The system of claim 15, wherein operations further comprise:
    receiving user input comprising a change to the optimal schedule, and in response and based on the change, again executing determining a cumulative gain to provide a set of revised schedules;
    identifying, from the set of revised schedules, a revised schedule having a maximum cumulative gain; and
    outputting the revised schedule having the maximum cumulative gain as the optimal schedule.

20. The system of claim 15, wherein the well data comprises one or more of well identifiers, well gains, locations, availability dates, distances between wells.

* * * * *